United States Patent
Doersam et al.

(10) Patent No.: US 9,878,485 B2
(45) Date of Patent: Jan. 30, 2018

(54) METHOD AND APPARATUS FOR PRODUCING EMBOSSED STRUCTURES IN RADIATION-CURING MATERIALS

(71) Applicant: HEIDELBERGER DRUCKMASCHINEN AG, Heidelberg (DE)

(72) Inventors: Edgar Doersam, Obertshausen (DE); Thorsten Euler, Darmstadt (DE); Immanuel Fergen, Karlsruhe (DE); Martin Haas, Darmstadt (DE); Evgeny Kurmakaev, Obertshausen (DE); Martin Schmitt-Lewen, Heidelberg (DE); Joachim Sonnenschein, Muehltal (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 940 days.

(21) Appl. No.: 14/018,619

(22) Filed: Sep. 5, 2013

(65) Prior Publication Data
US 2014/0061976 A1     Mar. 6, 2014

(30) Foreign Application Priority Data
Sep. 5, 2012 (DE) .................. 10 2012 017 539

(51) Int. Cl.
*B29C 59/16* (2006.01)
*B41F 19/02* (2006.01)
(Continued)

(52) U.S. Cl.
CPC .............. *B29C 59/16* (2013.01); *B41F 19/02* (2013.01); *B41F 23/0406* (2013.01);
(Continued)

(58) Field of Classification Search
CPC ......... B29C 59/16; B29C 59/02; B29C 59/04; B41F 19/02; B41F 19/062; B41F 23/0406;
(Continued)

(56) References Cited

U.S. PATENT DOCUMENTS 3,655,379 A * 4/1972 Gundlach ................ B41M 5/46
                                                    250/315.3
5,045,697 A * 9/1991 Schneider ............... B41F 13/10
                                                    101/487
(Continued)

FOREIGN PATENT DOCUMENTS

DE              4132476 A1     4/1993
DE       102006021069 A1    11/2006
(Continued)

OTHER PUBLICATIONS

DE 102011005594—machine English translation.*
(Continued)

*Primary Examiner* — Alison L Hindenlang
*Assistant Examiner* — Jerzi H Moreno Hernandez
(74) *Attorney, Agent, or Firm* — Laurence A. Greenberg; Werner H. Stemer; Ralph E. Locher (57) ABSTRACT

For the production of embossed microstructures in radiation-curing materials, use is made of a micro embossing form fixed to a reflective or scattering cylinder surface. Via a press nip, the micro embossing form comes into contact with the substrate guided over a cylinder or a deflection roller. The radiation-curing material is acted on in one or both pockets, before or after the press nip, with radiation which penetrates into the press nip by reflection or scattering.

5 Claims, 5 Drawing Sheets

(51) Int. Cl.
  *B41F 23/04*   (2006.01)
  *B41F 23/08*   (2006.01)
  *G03H 1/02*    (2006.01)
  *B29C 59/02*       (2006.01)
  *B29C 33/42*       (2006.01)
  *G03H 1/18*        (2006.01)

(52) U.S. Cl.
  CPC ............ *B41F 23/08* (2013.01); *G03H 1/028* (2013.01); *B29C 33/424* (2013.01); *B29C 59/022* (2013.01); *B29C 2059/023* (2013.01); *G03H 2001/185* (2013.01)

(58) Field of Classification Search
  CPC ........... B41F 23/08; B41F 17/00; B41M 1/24; G03H 1/028; G03H 2001/185
  See application file for complete search history.

(56) References Cited

U.S. PATENT DOCUMENTS

| | | | | |
|---|---|---|---|---|
| 5,480,596 | A * | 1/1996 | Okubo | B05C 1/0808 249/114.1 |
| 5,915,294 | A * | 6/1999 | Nyberg | D21G 1/0093 100/332 |
| 6,260,887 | B1 * | 7/2001 | Fujii | B29C 59/04 264/1.9 |
| 7,887,722 | B1 * | 2/2011 | Wu | B29C 59/046 156/229 |
| 2005/0202188 | A1 * | 9/2005 | Aono | B41M 5/52 428/32.34 |
| 2006/0254445 | A1 | 11/2006 | Masuda | |
| 2007/0070503 | A1 * | 3/2007 | Boswell | B41F 11/02 359/566 |
| 2008/0022875 | A1 | 1/2008 | Hirokawa et al. | |
| 2009/0056858 | A1 * | 3/2009 | Davila Casitas | B41F 16/00 156/184 |
| 2009/0174119 | A1 * | 7/2009 | Matsuo | B29C 35/0888 264/403 |
| 2010/0236685 | A1 * | 9/2010 | Nakamura | B41F 19/062 156/60 |
| 2011/0005412 | A1 * | 1/2011 | Fujii | B29C 59/04 101/216 |
| 2012/0148704 | A1 * | 6/2012 | Furuya | B29C 33/38 425/374 |
| 2012/0286436 | A1 * | 11/2012 | Chen | B29D 11/00288 264/1.24 |
| 2015/0064628 | A1 * | 3/2015 | Guo | G03F 7/30 430/316 |

FOREIGN PATENT DOCUMENTS

| | | |
|---|---|---|
| DE | 102007034302 A1 | 1/2008 |
| DE | 102009000445 A1 | 8/2010 |
| DE | 102010029423 A1 | 1/2011 |
| DE | 102010003435 A1 | 10/2011 |
| DE | 102011005594 A1 | 9/2012 |
| EP | 0683903 A1 | 11/1995 |
| EP | 1700696 A2 | 9/2006 |
| JP | 2011085316 A | 4/2011 |
| WO | 9418609 A1 | 8/1994 |
| WO | WO 0030854 A1 * | 6/2000 ............. B41F 17/00 |
| WO | WO 2006032493 A2 * | 3/2006 ......... B29C 35/0888 |

OTHER PUBLICATIONS

DE102010003435—machine English translation.*
DE102010003435—Human English Translation.*
JP201185316—English Machine Translation.*
Optical Properties (Nov. 9, 2013); file:///C:/Users/jhernandez/Desktop/619/ch10_Optical%20Properties%20(2%20slides%20per%20page).pdf.*
German Patent and Trademark Office Search Report, dated Mar. 21, 2013.

* cited by examiner

METHOD AND APPARATUS FOR PRODUCING EMBOSSED STRUCTURES IN RADIATION-CURING MATERIALS

CROSS-REFERENCE TO RELATED APPLICATION

This application claims the priority, under 35 U.S.C. § 119, of German patent application DE 10 2012 017 539.6, filed Sep. 5, 2012; the prior application is herewith incorporated by reference in its entirety.

BACKGROUND OF THE INVENTION

Field of the Invention

The invention relates to a method with which embossed structures in radiation-curing materials, for example in UV inks or UV varnishes, are applied to the product to be printed, preferably during a printing process. Such methods and the corresponding apparatus are used, for example, to apply micro embossed structures such as holograms, security features, etc in-line, i.e. at the same time during the production of a printed product in the press, in that the desired structure is impressed mechanically into the UV-curable inks or varnishes, which are still flexible following the application thereof to the substrate. UV radiation is applied directly during the embossing operation in order that the embossed structures can no longer run. Various solutions are known for the application of the UV radiation directly during the embossing process. For example, German published patent application DE 41 32 476 A1 describes a web-fed press in which the embossing form is applied to a glass cylinder. This makes contact with the freshly varnished printing material, which is guided over the glass cylinder. Located in the interior of the glass cylinder is the UV light source, which irradiates the contact point between the embossing form and the varnished printing material through the glass wall of the cylinder. This device is complicated and expensive, in particular because of the quartz glass cylinder used.

United States patent application publication US 2008/0022875 A1 and its counterpart German published patent application DE 10 2007 034 302 A1 describes a similar device in which a strip in the form of a transfer film with structured pull-off elements is placed on the surface of the freshly varnished or printed sheet guided over a cylinder. Here, two UV lamps irradiate the surface of the sheet through the structured strip and in this way cure the UV ink or the UV varnish on the sheet directly at the contact point. Then, when the ink or the varnish becomes solid on the sheet, the embossed patterns or hologram patterns are pulled off the cross-linking varnish by the transfer film.

This method is complicated, since the structured elements (holograms, etc) have to be produced in another method step and already have to be produced on the transfer film or adapted before they are then applied to the printed sheets in the press.

A quite similar device is described in United States patent application publication US 2006/0254445 A1 and its counterpart German published patent application DE 10 2006 021 069 A1. There, however, there the strip is formed as a film molding, since it transfers the structure impressed into the strip to the varnished sheet during the curing.

The methods and apparatus known from the prior art are complicated and expensive, among other things because of the use of endless or rolled strip materials.

SUMMARY OF THE INVENTION

It is accordingly an object of the invention to provide a method and an apparatus for producing embossed structures which overcome the above-mentioned disadvantages of the heretofore-known devices and methods of this general type and which provides for a method for producing embossed structures in-line during printing in a press with which the embossed structures can be applied reliably to the surface of the printing material without great effort.

With the foregoing and other objects in view there is provided, in accordance with the invention, a method of producing embossed structures in radiation-curing material, the method comprising:

applying an embossing form to a surface of a cylinder or a sleeve and causing the embossing form to come into contact with the radiation-curing material in a linear press nip; and irradiating the radiation-curing material with radiation for curing in a pocket before or after the press nip in a transport direction of the material.

With the above and other objects in view there is also provided, in accordance with the invention, an apparatus for producing embossed structures with micro embossing forms in radiation-curing materials, the apparatus comprising:

a plurality of sheet-guiding cylinders or web-deflecting rollers guiding sheet material or a web through the apparatus;

a carrier for the micro embossing forms having formed thereon embossed structures on a cylinder or on a sleeve affixed to the cylinder;

wherein the carrier is disposed to form together with one of the sheet-guiding cylinders or web-deflecting rollers a press nip in which the micro embossing forms come into contact with the radiation-curing materials; and one or more radiation sources disposed to irradiate the radiation-curing material in at least one pocket formed upstream and downstream of the press nip in a substrate transport direction, the one or more radiation sources being configured to cure the radiation-curing material.

In other words, according to the invention, for the application of the microstructures, use is made of embossing forms stretched over a metal cylinder, for example, having a reflective surface. The embossing forms can be fixed to the corresponding cylinder in a similar way to printing forms or blankets or sleeves. Accordingly, no glass cylinders are required in order to bring the UV radiation directly to the press nip via which the structures are impressed into the ink or the varnish on the printed substrate.

The invention can be used both in web-fed presses and also in sheet-fed presses. It is expedient if the cylinder surface to which the micro embossing form is applied is designed to be scattering and the material of the micro embossing form is transparent to UV. In this way, it is possible to shine the UV radiation into the press nip in which, by means of reflection or scattering at the cylinder surface and possibly also multiple passages through the micro embossing form, it then reaches the location of the event directly, i.e. in the press nip, where the micro embossing form comes into contact with the ink or the varnish on the printed substrate.

However, it may also be expedient to form the micro embossing form itself to be reflective, it being necessary for the reflection to be provided only at shallow angles of incidence. In conjunction with focusing elements in front of the UV radiation source, it is also possible in this way to achieve the situation in which the UV radiation reaches entirely into the press nip and there cures the ink or the varnish during the impression.

Furthermore, it may be expedient to provide a still further UV light source which, so to speak, already begins to cure the surface of the printing material as the latter runs into the press nip. In this way, the fresh ink or the varnish is given a consistency which permits microstructures to be impressed, since it is not yet cured, and, secondly, the time in which the impressed structure is maintained in the ink or the varnish layer before it runs away again is prolonged considerably. In this way, the final curing can be carried out very much more simply after the printing material has run through the press nip.

Other features which are considered as characteristic for the invention are set forth in the appended claims.

Although the invention is illustrated and described herein as embodied in a method for producing embossed structures in radiation-curing materials, and an apparatus suitable for the process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
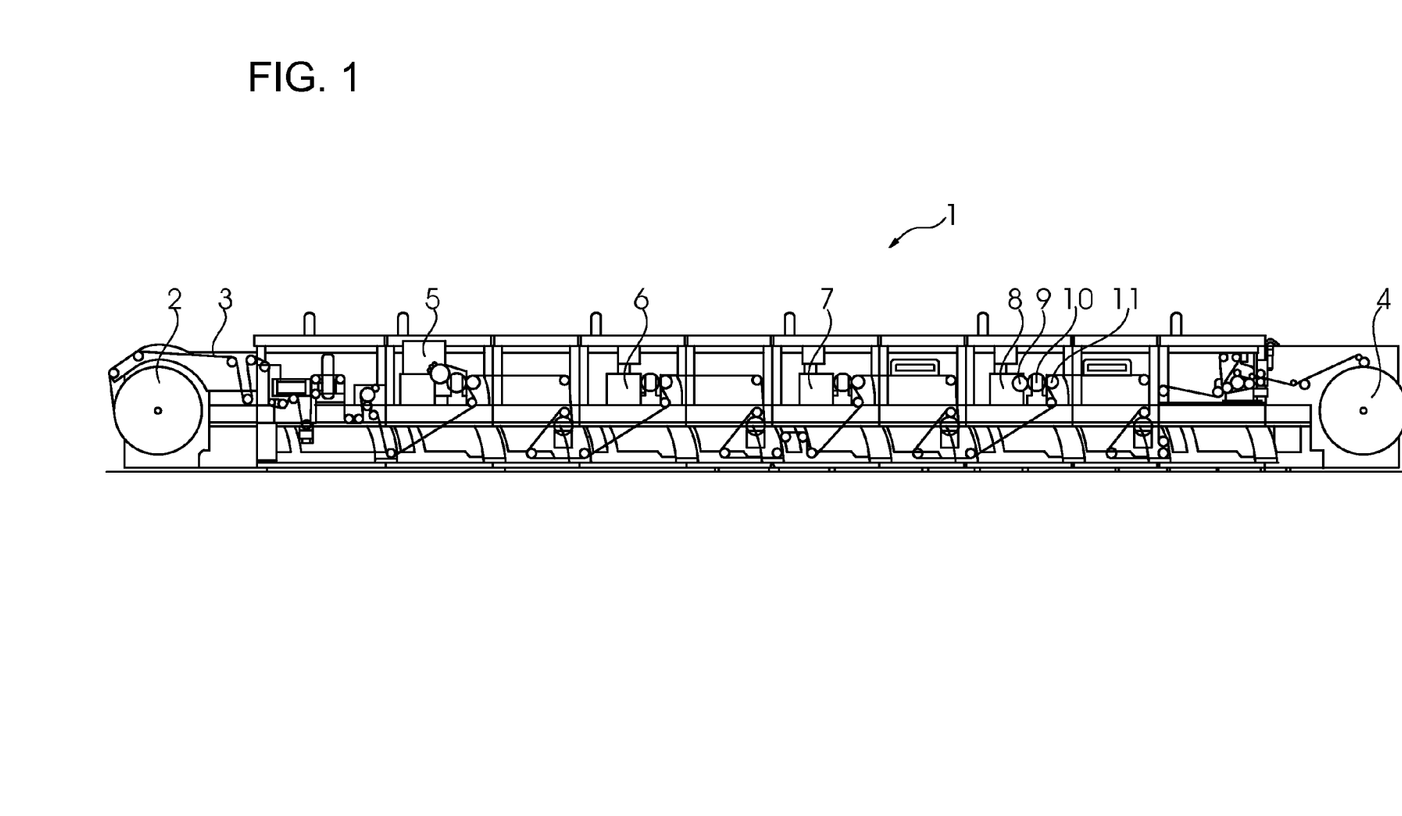
FIG. 1 shows a narrow-strip web-fed press, sectioned vertical-longitudinally in a simplified schematic representation.

Referring now to the figures of the drawing in detail and first, particularly, to FIG. 1 thereof, there is shown a narrow-strip web-fed press with a machine frame that is open toward the side of the viewer. A material web—paper or film—designated by 3 is guided over a multiplicity of deflection rollers. Numeral 2 designates the web roll from which the material web 3 is unwound, and 4 designates the roll onto which the material web 3 is wound up again after the material web 3 has been printed, varnished and finished in many ways and has been provided with micro embossings in a manner still to be described.

A plurality of printing and/or finishing units 5, 6, 7 and 8, past which the material web 3 is guided, are accommodated one after another in the machine frame. As a result of the modular construction of the machine, printing units operating in accordance with quite different printing methods can be used. Thus, 5 designates an offset printing unit, 6 a gravure printing unit, 7 a screen printing unit and 8 a flexographic printing unit. A machine having this construction is offered, for example, by the company Gallus Ferd. Rüesch AG, Harzbüchelstraße 34, 9016 St. Gallen, Switzerland under the designation RCS 330-HD.

Figure 2:
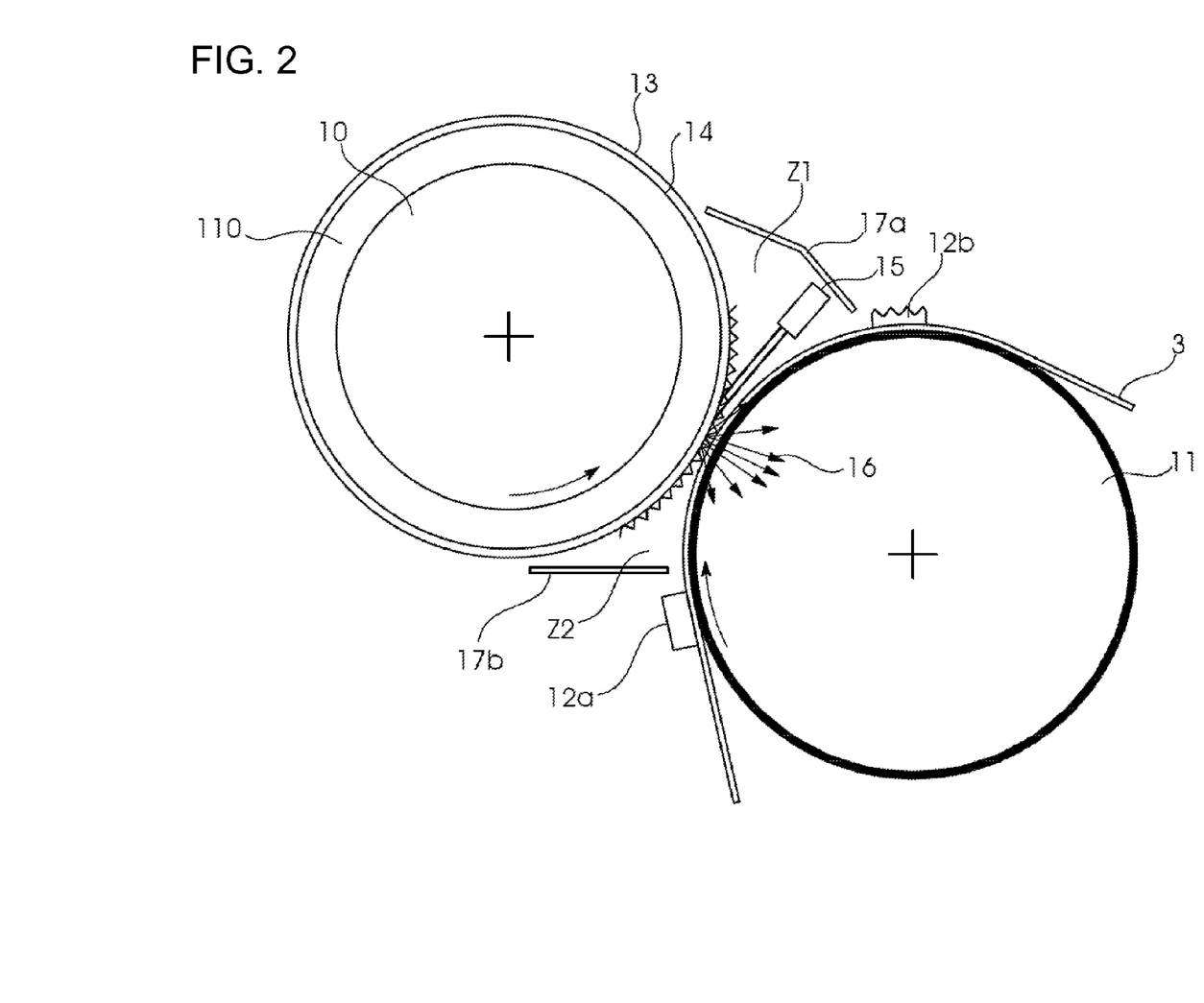
FIG. 2 shows a simplified, highly enlarged, representation of the region around the cylinders 10 and 11 in the flexographic printing unit 8 of the press of FIG. 1.

The flexographic printing unit 8 has now been converted, as described in FIG. 2, into an embossing unit for impressing microstructures such as holograms into a UV varnish layer previously applied to the material web 3. For this purpose, the cylinder 10 has been provided with a sleeve 110, on the outer side of which a metal layer 14 that reflects UV radiation has been applied. The material of the layer 14 can be, for example, aluminum or stainless steel or chromium. The reflective surface 14 in turn carries a micro embossing form 13 made of silicone rubber. The material silicone rubber is transparent in the wavelength range between 300 and 400 nm, in which UV varnishes are normally cured. The micro embossing form can be produced, for example, by being de-molded from a nickel shim, i.e. a thin nickel sheet produced by electroplating and having the embossing structures as a punch. It has a thickness of typically 2 mm and carries on its surface the microstructures de-molded from the shim. Because of its soft, flexible consistency and the low surface energy of silicone rubber, it is particularly well suited for the embossing of structures into still moist or only slightly dried ink or varnish layers.

The material web 3 guided over the deflection cylinder 11 carries on its surface the freshly printed image elements 12a, illustrated greatly exaggerated, which, in the course of the web movement, run through the press nip between the cylinder 10 or the sleeve 110 and the deflection roll 11.

Instead of already applying the ink or the varnish which the microstructure embossing is intended to carry to the printing material before the latter runs through the press nip, it may also be expedient to use the micro embossing form 13 as a varnishing blanket, so to speak, and thereon to apply the varnish or ink layer to the substrate 3 to be printed via an applicator roll, for example the roll 9 of the web-fed press illustrated in FIG. 1, while said substrate is running through the press nip, in which the micro embossing takes place at the same time.

In the pocket Z1 located downstream in relation to the movement of the material web 3, after the press nip between the two cylinders 10 and 11, a UV emitter 15 is installed over the entire width of the material web 3. This can be, for example, an array of UV-emitting diodes or UV laser diodes, which emit their radiation aimed at the press nip. The UV radiation emitted penetrates the silicone rubber of the micro embossing form 13, is reflected and scattered at the rough mirrored surface 14 of the sleeve 110, and the scattered radiation penetrates through the silicone rubber of the micro embossing form 13 again and then strikes the ink or varnish layer of the printed image element 12a just passing through the press nip, which layer is thus cured as it passes through the press nip and in the surface of which the depressions of the micro embossing form 13 are, so to speak, "frozen in" in this way, as can be seen schematically at a microstructure element designated by 12b.

In order to stop scattered UV radiation getting into the surroundings, the two pockets Z1 and Z2 downstream and upstream of the press nip are each partitioned off by a scattered light screen 17b and 17a.

Figure 3:
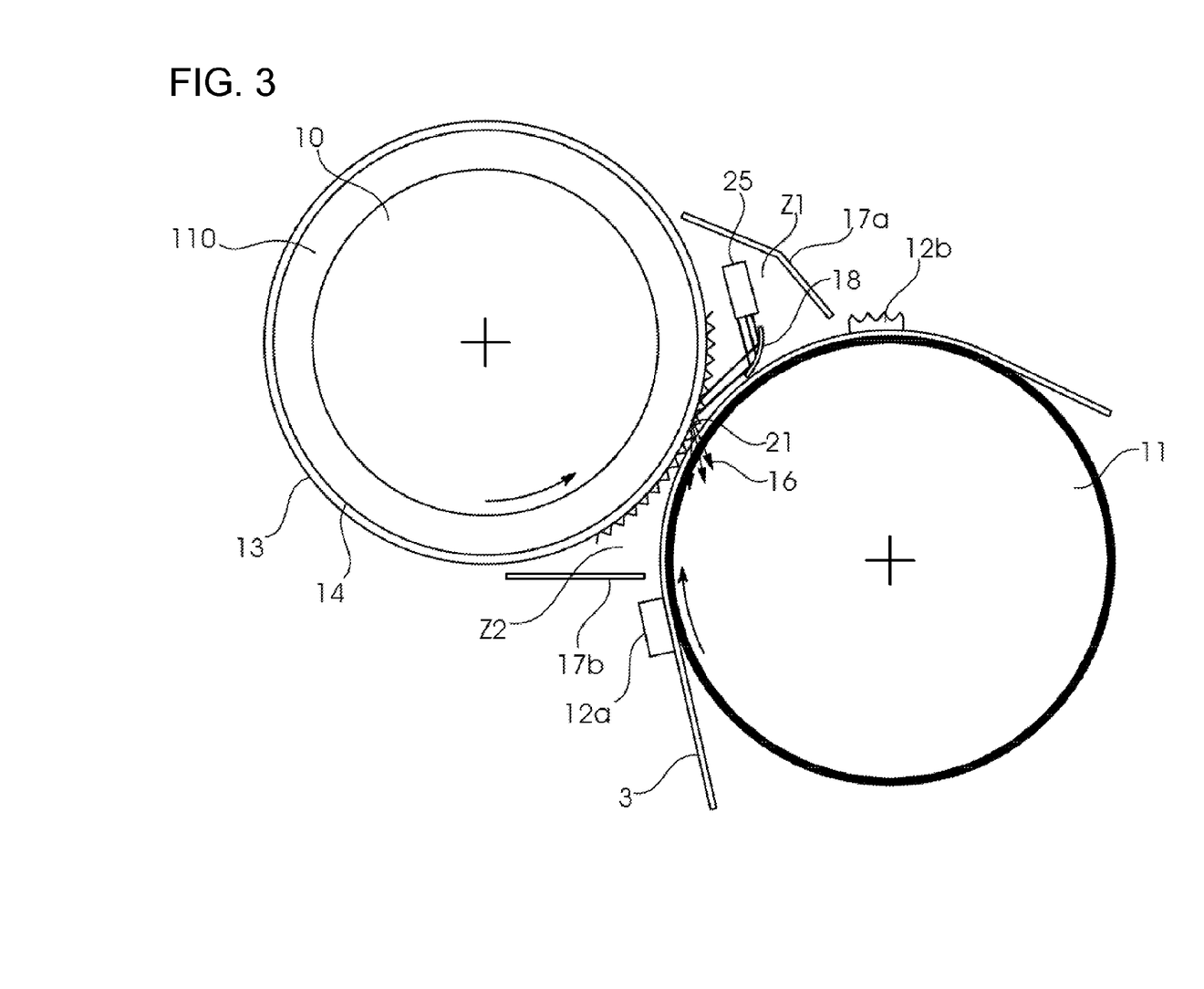
FIG. 3 is a similar view of an embodiment of the invention that is modified slightly in comparison with FIG. 2.

In order to increase the effectiveness of the UV curing process in the press nip, as illustrated in the exemplary embodiment according to FIG. 3, a focusing reflector 18 is connected upstream of the UV emitter designated by 25 there. This reflector has a high efficiency, since it concentrates the UV radiation with strip-like incidence in a linear focus 21 directly above the reflective layer 14 of the sleeve 110, from where the diffusely reflected UV radiation 16 reaches the press nip through the silicone layer of the micro embossing form 13.

Figures 4, 5:
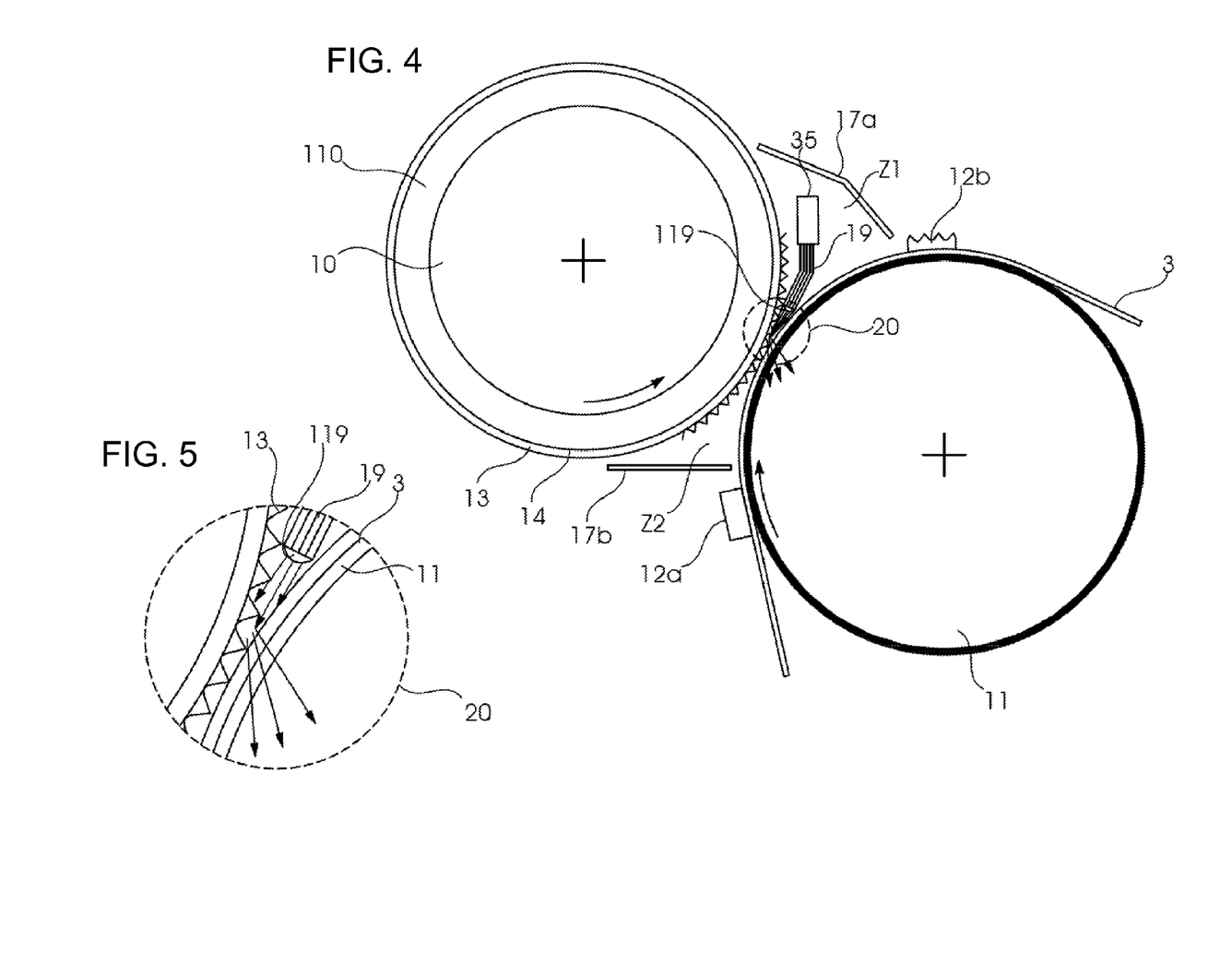
FIG. 4 is a similar view of yet a further exemplary embodiment of the invention modified in comparison with FIG. 2.
FIG. 5 shows a further enlarged representation of the region 20 from FIG. 4.

In the alternative exemplary embodiment according to FIG. 4, the focusing reflector mirror 18 is left out. Instead, optical fibers 19 are placed on the light exit windows of the UV diode array designated by 35, which fibers guide the emitted UV light in the pocket located downstream after the press nip until entirely in the press nip. Immediately in front of the press nip, the UV radiation emerges from the fiber ends, passes through the UV-transparent micro embossing form 13 and is scattered into the press nip at the roughly mirrored surface 14 of the sleeve 110.

In a quite similar exemplary embodiment, illustrated only as a detail in FIG. 5, mirroring of the sleeve 110 is omitted. Instead, the micro embossing form 13 consists of a material such as silicone having embedded metal particles, which reflects or scatters the UV radiation for the curing of the moist ink or varnish layer of the printed image element 12a, in particular on the rear side. This is achieved, for example, by means of a two-layer structure of the silicone micro embossing form 13 having a high proportion of metal particles on the rear side and a metal-free structure of the silicone layer on the embossing side. If necessary, the micro-rough surface of the cylinder or cylinder cover or sleeve 110, on which the micro embossing form 13 rests, also ensures diffuse reflection of the UV radiation at this point in the direction of the fluid of the printed image element 12a to be cured in the press nip. Since the optical fiber 19 leads the UV radiation up very close to the press nip, and thus a considerable part of the UV radiation is coupled into the UV-transparent silicone micro embossing form 13 and thus reaches the press nip, effective thorough curing of the ink or varnish layer of the printed image element 12a in the press nip or directly thereafter can also be achieved in this way.

In the above-described exemplary embodiments, the UV emitter is in each case located in the pocket Z1 located downstream after the press nip. However, it is also possible, in particular when use is appropriately made of ink or varnish systems operating with a curing delay, to arrange the UV emitters in the pocket Z2 located upstream before the press nip.

Figure 6:
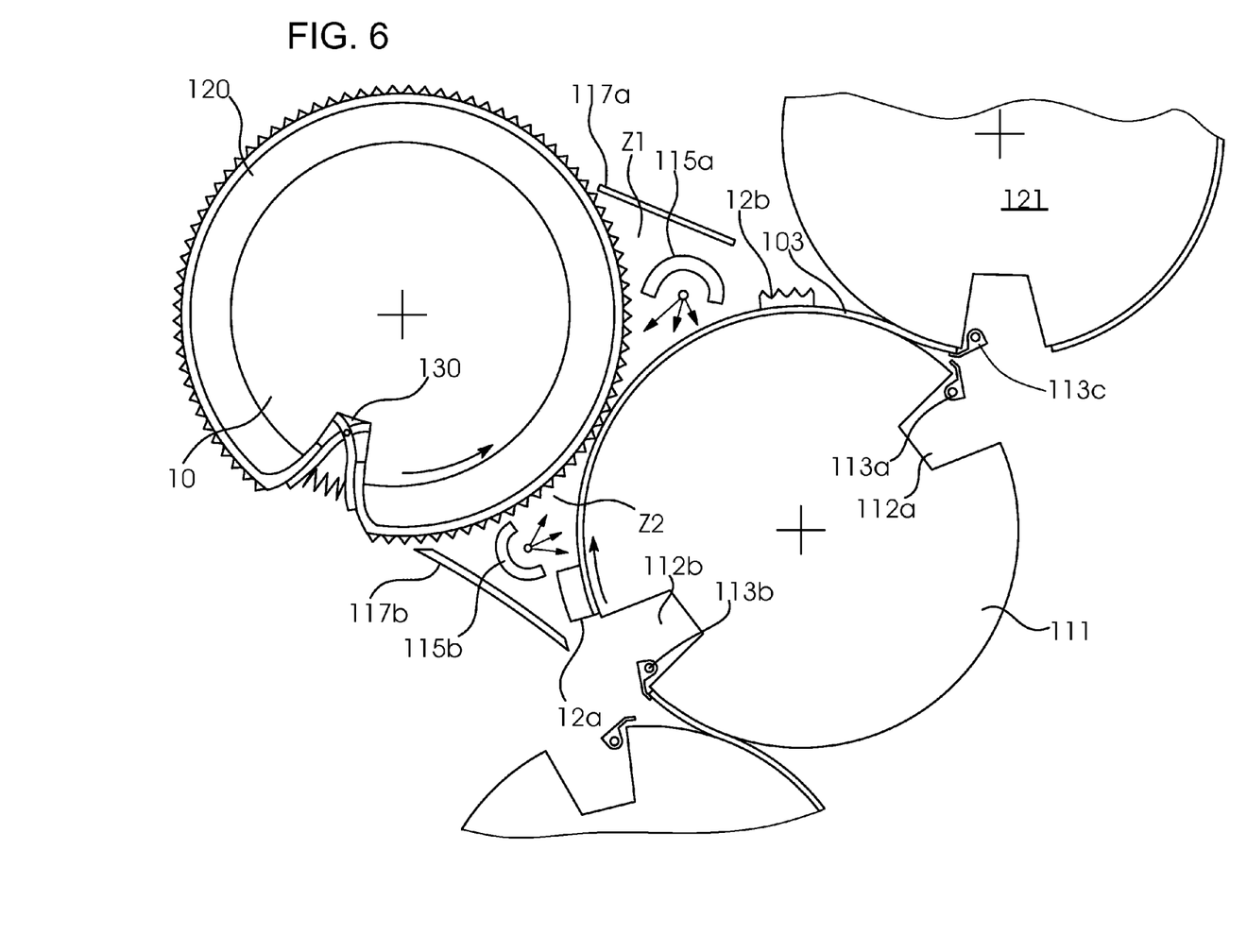
FIG. 6 is a schematic diagram of an alternative exemplary embodiment of the invention in a sheet-fed press.

Furthermore, it is possible to operate with UV emitters in both pockets, as is described in the following exemplary embodiment according to FIG. 6. In FIG. 6, 111 designates a double-size impression cylinder of a sheet-fed press. Said cylinder has two cylinder channels 112a and 112b, in which gripper bars 113a and 113b are accommodated, by which the sheet 103 running through is held until it is conveyed onward by the next following transport cylinder 121. In addition, in FIG. 6, the freshly printed image elements are again designated by 12a and, following their embossing with microstructure elements, are designated 12b.

The embossing cylinder 10 has only the single diameter as compared with the cylinder 111 and likewise has a channel 130, in which a plate 120, which is wound around the cylinder and once more carries a micro embossing form 113 on its outer side, is held by clamping devices, not specifically illustrated.

In the pocket Z2 located upstream of the press nip, there extends over the entire cylinder length, behind a screen 117b, a UV lamp 115b, the wavelength and output of which are matched to the UV ink or the UV varnish of the printed image element 12a in such a way that the ink or the varnish has only been pre-cured before the passage through the press nip to such an extent that, although it is firm, it is still soft and flexible. Thus, the microstructure can be impressed thereon in the press nip without it immediately losing the embossed structure again after emerging from the press nip. In the pocket Z1 placed downstream there is a second UV light source 115a, the wavelength and output of which are now chosen such that the ink or varnish layer is finally thoroughly cured there following passage through the press nip.

The method described here is suitable in particular for cationic curing or for UV material systems, that is to say inks and varnishes, which cross-link via cationic initiators.

The desired "two-stage" curing can be achieved in that about 20 to 40% of the radiated power for the UV lamp 115a is expended for the UV lamp 115b. Suitable inks and varnishes for such a two-stage curing process are offered, for example, by the company Weilburger Graphics GmbH in Gerhardshofen, Germany, under the designations Senolith-UV-Glanzlack 360049 (radical) and Senolith-UV-Hochglanzlack 365010 (cationic), and by Heidelberger Druckmaschinen AG, Heidelberg, Germany, under the designation Saphira UV-Coating HG FB U8730 (radical).

The invention has been described above by using an in-line printing system. However, the method can also be used in all installations which are suitable for coating substrates with liquid media. Furthermore, the method according to the invention can be used in printing systems of any type, including inkjet or electro-photographic printing systems, and in print further processing if in the further processing appliance, such as a punch, a stapler or a folding box gluing machine, for example, the product processed there is once more intended to be provided directly with a micro embossing in-line.

In addition to the embossing of microstructures onto flat substrates such as paper film, web or roll products, the method can also be implemented in filling installations and in packaging machines.

The micro embossing form can also be designed very differently, as a metal or metal structure, as a plastic film, possibly reinforced with metal or plastic fabric, etc.

Furthermore, it is possible to provide the micro embossing form with an anti-adhesive layer. Particularly suitable for this purpose is the silicone rubber that is transparent in the ultraviolet spectral range and is marketed under the name "Sylgard 184" by Dow Corning GmbH in Wiesbaden, Germany.

The invention has been described above in conjunction with UV-curable inks and varnishes. However, it is also possible to use inks and varnishes that cure in the visible wavelength range or in the infrared range, and to provide appropriate emitters for the curing of the microstructures.

Finally, the method can be extended still further in that the micro embossing form is provided in a further production step with a varnish to protect the micro embossing structure located underneath or with a varnish layer matched in terms of refractive index to the embossed varnish or the embossed ink. This further layer can be applied either to the entire area or in a screened manner.

By using the method according to the invention, it is possible to comply with high security standards during the production of printed products, since the production of the security feature can now also be carried out directly at the end of the production chain and does not necessarily have to be supplied as a label. In addition, the expenditure for producing and changing the embossing form is significantly more beneficial than in the methods known in the prior art.

The invention claimed is:

1. A method of producing embossed structures in radiation-curing material, the method comprising:
    applying an embossing form to a surface of a cylinder or a sleeve and causing the embossing form to come into contact with the radiation-curing material in a linear press nip; and
    irradiating the radiation-curing material with UV radiation for curing in a pocket following the press nip downstream in a transport direction of the radiation-curing material; and
    wherein the surface of the cylinder or of the sleeve is reflective and/or scattering in a wavelength range of the UV radiation used for curing.

2. The method according to claim 1, wherein the embossing form is a micro-embossing form and a material of the micro-embossing form is transparent to radiation in a wavelength range of the radiation used for the curing.

3. The method according to claim 1, which comprises:
    providing a first radiation source in a pocket upstream of the press nip in the transport direction of the radiation-curing material, wherein the first radiation source is dimensioned with respect to the wavelength and/or the power of the radiation such that the radiation-curing material is only partially cured and remains deformable as it enters the press nip; and
    providing a second radiation source in the pocket following the press nip downstream in the transport direction of the radiation-curing material, wherein the a power and/or wavelength of the second radiation source is dimensioned such that the radiation-curing material is completely and thoroughly cured after having traversed the press nip.

4. The method according to claim 1, wherein the radiation-curing material is a web product and the method further comprises coating the web product with liquid media.

5. The method according to claim 1, which comprises embossing and curing security labels, printed electronics, optically readable codes or holograms.

* * * * *